(12) United States Patent
Hemmes

(10) Patent No.: US 6,607,853 B1
(45) Date of Patent: Aug. 19, 2003

(54) METHOD OF CONVERTING A CARBON-COMPRISING MATERIAL, METHOD OF OPERATING A FUEL CELL STACK, AND A FUEL CELL

(75) Inventor: Klaas Hemmes, Leiden (NL)

(73) Assignee: Technische Universitiet Delft, Delft (NL)

( * ) Notice: Subject to any disclaimer, the term of this patent is extended or adjusted under 35 U.S.C. 154(b) by 0 days.

(21) Appl. No.: 09/647,866

(22) PCT Filed: Apr. 7, 1999

(86) PCT No.: PCT/NL99/00207

§ 371 (c)(1),
(2), (4) Date: Nov. 29, 2000

(87) PCT Pub. No.: WO99/52166

PCT Pub. Date: Oct. 14, 1999

(30) Foreign Application Priority Data

Apr. 7, 1998 (NL) .............................................. 1008832

(51) Int. Cl.⁷ .............................. H01M 8/00; H01M 4/00
(52) U.S. Cl. ................................ 429/13; 429/29; 429/12
(58) Field of Search ............................... 429/12, 13, 16, 429/29, 30, 38, 39

(56) References Cited

U.S. PATENT DOCUMENTS

| 3,138,490 A | | 6/1964 | Tragert et al. |
| 3,252,773 A | | 5/1966 | Solomon et al. |
| 3,876,527 A | | 4/1975 | Dugan et al. |
| 3,916,617 A | | 11/1975 | McKenzie et al. |
| 4,017,271 A | | 4/1977 | Barclay et al. |
| 4,921,765 A | | 5/1990 | Gmeindl et al. |
| 5,707,762 A | * | 1/1998 | Johnssen ...................... 429/17 |
| 5,914,200 A | * | 6/1999 | Schabert et al. .............. 429/34 |

FOREIGN PATENT DOCUMENTS

| EP | 0 333 261 A2 | 9/1989 |
| EP | 0 369 059 A1 | 5/1990 |
| EP | 0 399 077 A1 | 11/1990 |
| EP | 0 564 796 A1 | 10/1993 |
| GB | 2 278 010 A | 11/1994 |
| JP | 62147664 | 7/1987 |
| JP | 63110557 | 5/1988 |
| JP | 05094831 | 4/1993 |
| JP | 11067258 | 3/1999 |
| WO | WO 94/29922 | 12/1994 |
| WO | WO 98/21770 | 5/1998 |

OTHER PUBLICATIONS

Vutetakis, D.G., et al., "Electrochemical Oxidation of Molten Carbonate–Coal Slurries," *Journal of Electrochemical Soc*, vol. 134, No. 12, pp 3027–3035 (Dec. 1987).

Weaver, R.D., et al., "Direct Use of Coal in a Fuel Cell: Feasibility Investigation," *Chem Abstract* Columbus OH, vol. 85, vol. 13–12, No. 24, p. 146 (1976).

Yentekakis, I.V., et al., "A Novel Fused Metal Anode Solid Electrolyte Fuel Cell for Direct Coal Gasification: A Steady–State Model," *Indus & Eng Chem Research*, vol. 28, No. 9, pp 1414–1424 (Sep. 1989).

* cited by examiner

*Primary Examiner*—Randy Gulakowski
*Assistant Examiner*—Donald V. Scaltrito
(74) *Attorney, Agent, or Firm*—Jeffrey D. Myers

(57) ABSTRACT

The invention relates to a method of converting a carbon-comprising material at elevated temperature in the presence of a molecule that comprises at least one oxygen atom. According to the invention the carbon-comprising material in the fuel cell is converted substantially to carbon monoxide in a reaction with a negative enthalpy ($\Delta H$) and a positive entropy change ($\Delta S$), heat is supplied to the fuel cell, and at least one of the contributing reactions resulting in the formation of carbon monoxide is an electrochemical reaction producing electricity. This is a more efficient method of converting heat into electricity and at the same time converting the enthalpy of the gasification reaction into electricity.

11 Claims, 3 Drawing Sheets

METHOD OF CONVERTING A CARBON-COMPRISING MATERIAL, METHOD OF OPERATING A FUEL CELL STACK, AND A FUEL CELL

The present invention relates to a method of converting a carbon-comprising material at elevated temperature ture in the presence of a molecule that comprises at least one oxygen atom, wherein the conversion takes place in a fuel cell.

Such a method is generally known for the generation of electricity. The fuel is converted by a process that is called internal reforming. The carbon-comprising material, the fuel, is usually a gaseous or liquid fuel, such as methane or methanol. The decomposition of the fuel causes the formation of hydrogen, which is utilized by the fuel cell for the generation of electricity. During this process hydrogen is oxidized to water, which water contributes to the decomposition of the fuel. Another method known in the art is the partial combustion of a fuel such as coal, or to contact the fuel at elevated temperature with water thereby yielding water gas, a mixture of hydrogen and carbon monoxide. This mixture is subsequently conducted to a fuel cell and hydrogen and carbon monoxide are converted into water and carbon dioxide thereby producing electricity.

It is the object of the present invention to provide a method according to the preamble whereby heat can be converted into electricity at very high efficiency.

To this end the method according to the present invention is characterized in that a fuel cell is used selected from the group comprising a) a molten corrosive salt fuel cell, and b) a solid oxide fuel cell, and the carbon-comprising material in the fuel cell is converted substantially to carbon monoxide in a reaction with a negative enthalpy ($\Delta H$) and a positive entropy change ($\Delta S$), heat is supplied to the fuel cell, and that at least one of the contributing reactions resulting in the formation of carbon monoxide is an electrochemical reaction producing electricity.

Thus it is possible, by avoiding the Carnot-cycle, to perform a highly efficient conversion of heat into electricity. This involves a self-regulating process. When the temperature rises, more heat is withdrawn from the system and converted into electricity, and vice versa. At a particular temperature, which temperature can be adjusted by varying the electric load, an equilibrium will be reached. When a plant converts $CO_2$ into biomass, the plant uses energy for the reduction of the entropy. With the prior art methods of utilizing biomass, and fuel in general, this energy is lost. In contrast, with a method according to the present invention, the exergetic value of the fuel will be optimally utilized. This is a more efficient method of converting heat into electricity and at the same time converting the enthalpy of the gasification reaction into electricity. In the present application carbon-comprising material is understood to be an oxidizable carbon-comprising material such as coal, biomass, organic waste, hydrocarbons, etc.

Advantageously the fuel cell is supplied with additional heat.

The heat supply may, for example, come from a downstream or integrated fuel cell. It is also possible to use solar energy, for example, by using parabolic mirrors or a Fresnel-lens. In this connection it may be mentioned that the high heat capacity of (carbonate) salt can contribute to an efficient heat transport.

According to a favourable embodiment, the carbon-comprising material is solid carbon-comprising material. In particular the solid carbon-comprising material is selected from the group comprising carbon products, biomass and thermically treated biomass.

The method according to the present invention limits the number of pretreatments generally required for some of the materials to be converted. For example, the necessity to reduce the size of the solid carbon-comprising material is diminished. In the present invention the term carbon products encompasses all forms of carbon, natural and unnatural, such as coal, graphite and coke. One example of thermically-treated biomass is charcoal.

A first interesting embodiment of the method according to the present invention is characterized in that as anode an electricity-conducting, solid carbon material-comprising anode is used.

Such an anode made of, for example, graphite is thus able to fulfil two functions simultaneously.

According to a second embodiment, solid carbon-comprising material particles are brought into contact with molten carbonate, and due to flow carbon-comprising material particles come into contact with the anode.

The advantage of this embodiment is that a very large reaction surface can be achieved. Flow can occur a) spontaneously, as caused by the development of gas, b) the molten carbonate can be passed along the anode or c) the anode can be moved by the carbonate.

According to an advantageous embodiment conversion is performed at a temperature higher than 1000 K, in particular higher than 1100 K.

In this way the formation of carbon monoxide is promoted, which carbon monoxide can be used for a variety of purposes, for example, synthesis or for a downstream or integrated fuel cell. The temperature can conveniently be regulated by varying the electrical load of the fuel cell. When operating at elevated temperature, the sensitive parts must be protected against corrosion. For example, stainless steel parts may be used, whose sides coming into contact with a molten corrosive salt are provided with a coating of titanium nitrite or titanium carbide. This coating serves as diffusion barrier, which in turn can be protected by applying a coating of gold. Instead of a gold layer it is advantageous to apply $Cu_3Au$, e.g. by vapour deposition. A part of the copper dissolves in the molten carbonate salt, leaving behind a corrosion-resistant layer. The molten carbonate salt may be provided by any carbonate known in the art and optionally one can use a eutectic mixture of carbonate salts.

According to a favourable embodiment the treatment is performed in the presence of a catalyst, such as a metal ion that may have two positive valencies.

By using a catalyst the conversion may be enhanced so that depending on the requirements, conversion may, for example, take place at lower temperatures and/or in a smaller reactor volume.

The advantage of using a metal ion as catalyst is that it is easy to both homogenously introduce and maintain in the molten carbonate.

The anode gas from the anode of the fuel cell is rich in carbon monoxide. In the method according to the present invention therefore, the concentration of carbon dioxide in the gas leaving the anode is considerably lower than the concentration of carbon monoxide. The carbon monoxide may be used, for example, for synthesis purposes or the carbon monoxide-comprising gas may conveniently be used in a further high-temperature fuel cell for the generation of electricity, which fuel cell would advantageously be selected from the group comprising a molten carbonate fuel cell and a solid-oxide fuel cell.

If carbon monoxide is used for the generation of electricity, the heat developped in the second fuel cell for the generation of electricity may advantageously be utilized for the conversion of carbon product or thermically treated biomass into carbon monoxide. Oxygen and combustible gas are not in direct contact, this is advantageous both in respect to safety and exergy. Since some of the molten carbonate will evaporate, it is possible, when using a molten carbonate fuel cell operated with carbon monoxide, to compensate carbonate losses in the molten carbonate fuel cell. This compensation and the use of the above-described coating against corrosion allow the fuel cell to be operated at elevated temperature. This promotes the formation of CO. The elevated temperature also benefits the speed of the reactions so that polarization losses are greatly reduced.

Finally the invention relates to a method of operating a fuel cell stack, wherein the fuel cell stack comprises at least two fuel cell structures, in a first fuel cell structure anode gas is passed in a first direction along an anode, the flow rate being chosen such that the degree of utilization is less than 45%, the anode gas from the first fuel cell structures is subsequently passed in an opposite direction through a second fuel cell structure, wherein the degree of utilization is again less than 45%, and wherein the fuel cell structures are electrically connected in series.

Here fuel cell structure is understood to be a fuel cell or a fuel cell substack. In the case where the number of fuel cell structures is three of more, the stacking sequence is not important. In this manner, in particular due to the low degree of utilization in a fuel cell structure, a homogenous distribution of temperature and in particular a homogenous distribution of flow in the fuel cell stack can be achieved while increasing the electrical efficiency.

The invention also relates to a fuel cell suitable for the application of the method according to the invention, which fuel cell comprises a solid, negatively charged oxygen species-permeable matrix having a first side and a second side, which matrix is provided at the first side with a cathode and which first side is adapted for passing of an oxygen-comprising gas along the cathode, and which second side is in contact with a liquid corrosive salt.

In such a fuel cell the anode, which is also in contact with the molten salt, may partially cover the second side of the matrix (in such a manner that oxygen species that may or may not be charged, can enter the carbonate matrix) or may be positioned at a distance from the matrix in the molten salt.

The invention will now be explained with reference to the description below and with reference to the drawings, in which FIG. 1 shows a fuel cell according to the invention;

Figure 1:
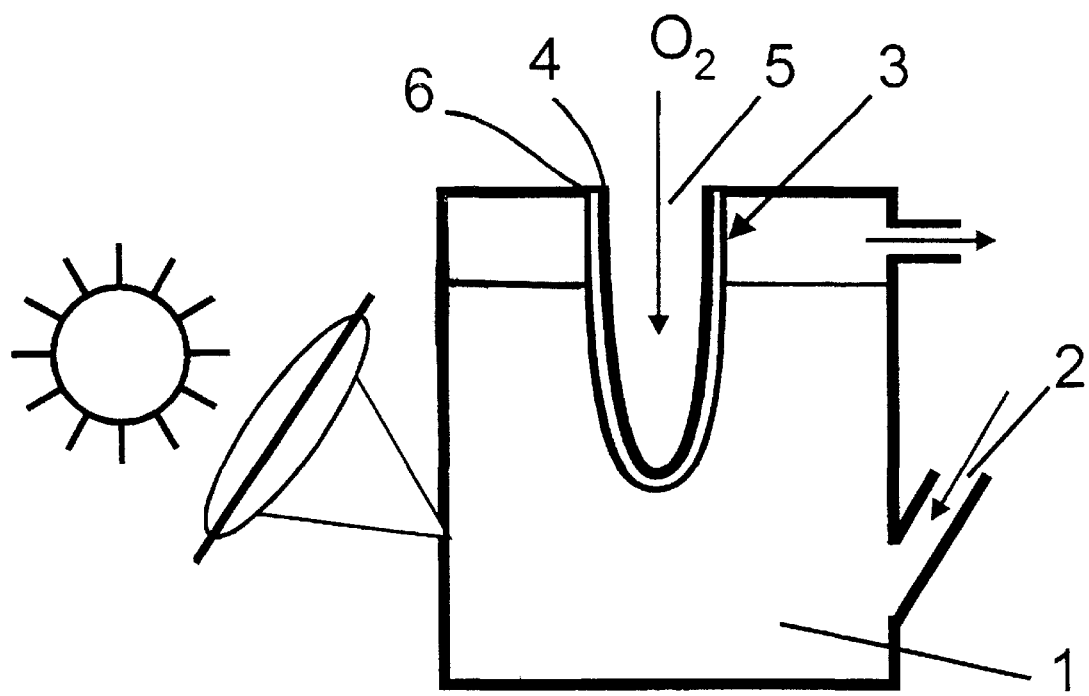

FIG. 1 represents a fuel stack comprising a chamber 1 into which carbon-comprising material can be introduced via inlet 2. The chamber 1 contains a molten carbonate salt. The carbonate salt is in contact with a hollow body 3 having at the inside a cathode 4, to which oxygen is supplied via inlet 5. In the embodiment represented here the fuel cell is operated in dead end mode. If the oxygen is not pure, the hollow body 3 will obviously also comprise an outlet for non-reacted cathode gases, as is generally known in the art. The hollow body 3 is formed, for example, from yttrium-stabilized zirconium oxide (YSZ).

The hollow body 3 is in direct contact with the molten carbonate. The material for the cathode 4 may be any material known in the art to be suitable for such cathodes, for example, platinum. The outside of the hollow body from YSZ is provided with a porous anode 6, for example, nickel. Here the oxide ion formed from oxygen transported through the YSZ comes into contact with carbon, carbon monoxide or other reactants from the molten carbonate. The oxide ion may also be taken up in the molten carbonate where it may react with, for example, a carbon particle which as a result becomes charged. According to another embodiment (not shown) the particle may donate this charge to an anode 5 inserted in the carbonate. The reaction or reactions may be performed with or without a catalyst such as, for example, the above-defined metal ion catalyst. As metal ion a vanadium ion may be considered. According to the invention many (parallel) reaction paths are created, thereby allowing the conversion to take place as quickly as possible.

Instead of passive flow caused by the development of gas (in particular carbon monoxide) aiding reactants and reaction products in reaching the anode, it is also possible to actively pass the molten carbonate along the anode. In addition, or in its stead, it is also possible to move the anode. For the efficient conversion of heat into electricity it is preferred to supply heat to a fuel cell, for instance, by using (focused) solar radiation.

Figure 2:
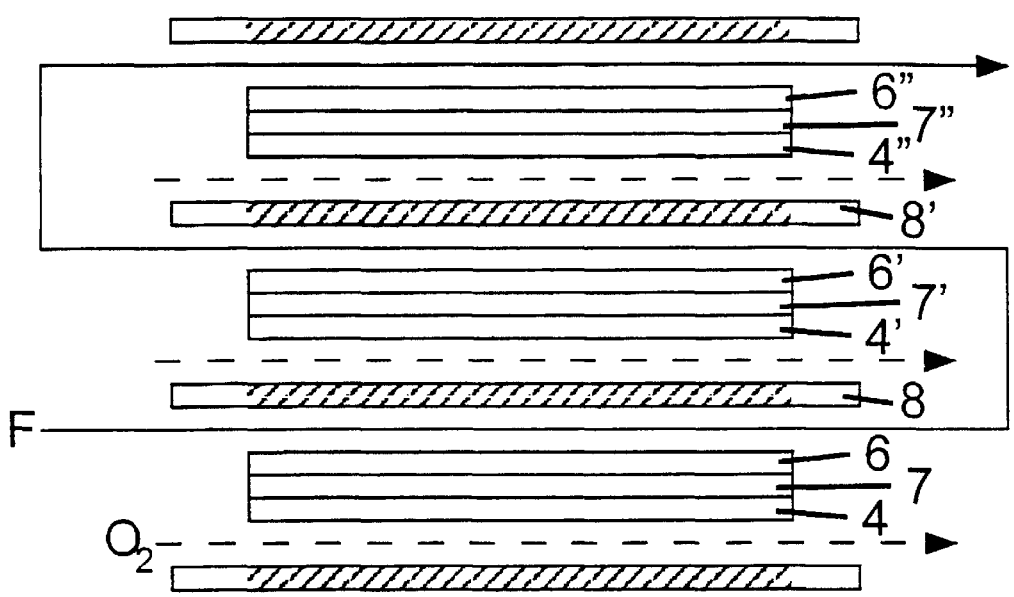
FIG. 2 shows a method of operating a fuel cell stack.

FIG. 2 shows how a fuel cell stack can be operated advantageously. The illustrated fuel cell stack comprises three fuel cell structures, however, it could also be 2 or more than 3. Each fuel cell structure comprises an anode 6, an electrolyte 7, a cathode 4, and the fuel cell structure are separated from each other by means of a separator plate 8. A fuel-comprising flow F is conducted along the anode of each fuel cell structure, such that maximally 45% of the fuel is converted. The fuel-comprising flow is suitably a suspension of carbon-comprising material in molten carbonate, but is not limited to liquid flows and may, for example, be a hydrogen-comprising flow. As shown, the flow F after being conducted along an anode 6, is preferably passed substantially in the opposite direction along anode 6 of the next fuel cell structure. This results in a better distribution of temperature and flow in the fuel cell stack, thereby achieving a higher electrical efficiency. The figure also schematically shows the supply and discharge of an oxygen-comprising flow.

Figure 3:
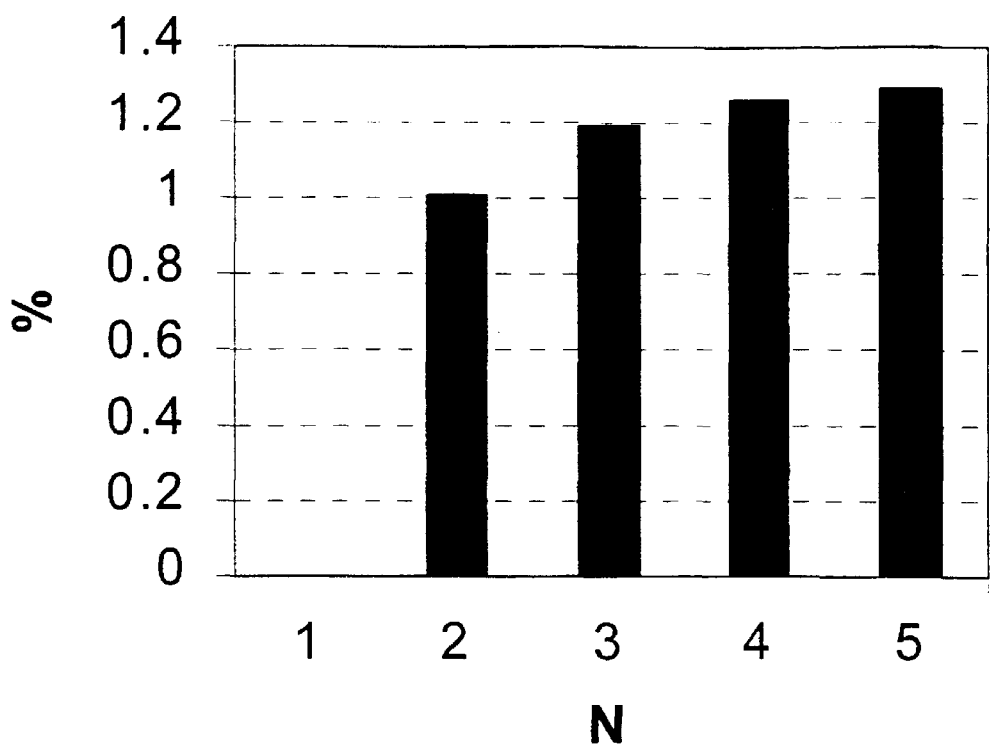
FIG. 3 shows a graph in which the percentage increase of the efficiency of a fuel cell stack using the above method of operating the fuel cell stack is plotted as function of the number of subunits of the stack.

With the aid of the equations 18, 19 and 30 from J. of Powersources, 63, pp. 221–234 (1996) by Standaert F. et al. the extra losses resulting from a non-homogenous flow can be calculated. When these losses are calculated for one cell and, as according to the invention, one fuel cell stack comprising N cells, it is possible to calculate the increase in electrical efficiency in percent. This calculation is performed on the basis of known values for the total utilization of the fuel, the mean flow density and the specific internal resistance of the fuel cell. The constant "alpha" mentioned in the formula is the mean decrease of the Nernst-voltage per unit utilization. A typical value for this is 180 mV. In this way it is possible to calculate the positive effect of the electrical efficiency for a molten carbonate fuel cell at 650° C. with utilization of 80 percent and a mean power density of 119 $mW/cm^2$. The results are shown in FIG. 3 wherein N is the number of fuel cell units.

What is claimed is:

1. A method of converting a material in the presence of a molecule in a fuel cell heated to an elevated temperature by direct solar energy wherein the material comprises carbon, the molecule comprises at least one oxygen atom and the fuel cell comprises a molten corrosive salt fuel cell and wherein the material substantially converts to carbon monoxide through a reaction comprising a negative enthalpy change and a positive entropy change and at least one electrochemical reaction producing electricity.

2. A method according to claim 1 wherein the carbon-comprising material is solid carbon-comprising material.

3. A method according to claim 1 wherein the carbon-comprising material is selected from the group comprising carbon products, biomass and thermally treated biomass.

4. A method according to claim 1, wherein the fuel cell comprises an anode comprising a solid carbon material.

5. A method according to claim 1, wherein solid carbon-comprising material particles are brought into contact with molten carbonate and due to flow the particles come into contact with the anode.

6. A method according to claim 1 wherein conversion is performed at a temperature higher than 1000 K, in particular higher than 1100 K.

7. A method according to claim 1, wherein the conversion is performed in the presence of a catalyst.

8. A method according to claim 7, wherein the catalyst is a metal ion that may have two positive valency numbers.

9. A method according to claim 1, wherein carbon monoxide-comprising gas in a second fuel cell, selected from the group consisting of a molten carbonate fuel cell and a solid oxide fuel cell, is used for the generation of electricity.

10. A method according to claim 1, wherein heating occurs with the aid of the developed by the second fuel cell.

11. A fuel cell comprising a solid negatively charged oxygen species-permeable matrix having a first side and second side, which matrix is provided at the first side with a cathode and which first side is adapted for passing of an oxygen comprising gas along the cathode, and which second side is in contact with a liquid corrosive salt, which fuel cell is suitable for inclusion in a fuel cell stack comprising at least two fuel cell structures, wherein a first fuel cell structure anode gas is passed in a first direction along an anode, the flow rate being chosen such that the degree of utilization is less than approximately 45%, the anode gas from the first fuel cell structures being substantially passed in an opposite direction through a second fuel cell structure, wherein the degree of utilization is again less than approximately 45%, and wherein the fuel cell structures are electrically connected in series.

* * * * *